(12) United States Patent
Baumeister

(10) Patent No.: US 11,134,701 B2
(45) Date of Patent: Oct. 5, 2021

(54) METHOD FOR COATING A LOLLIPOP

(71) Applicant: GEA Food Solutions Weert B.V., RV Weert (NL)

(72) Inventor: Bruno Gerfried Baumeister, Aachen (DE)

(73) Assignee: GEA FOOD SOLUTIONS WEERT B.V., RV Weert (NL)

( * ) Notice: Subject to any disclaimer, the term of this patent is extended or adjusted under 35 U.S.C. 154(b) by 261 days.

(21) Appl. No.: 15/573,620

(22) PCT Filed: May 12, 2016

(86) PCT No.: PCT/EP2016/060758
§ 371 (c)(1),
(2) Date: Nov. 13, 2017

(87) PCT Pub. No.: WO2016/192956
PCT Pub. Date: Dec. 8, 2016

(65) Prior Publication Data
US 2018/0116242 A1    May 3, 2018

(30) Foreign Application Priority Data
Jun. 1, 2015  (EP) ..................................... 15170056

(51) Int. Cl.
*A23G 3/34* (2006.01)
*A23G 3/56* (2006.01)
*A23G 3/24* (2006.01)

(52) U.S. Cl.
CPC ......... *A23G 3/0085* (2013.01); *A23G 3/0093* (2013.01); *A23G 3/24* (2013.01); *A23G 3/563* (2013.01); *A23V 2002/00* (2013.01)

(58) Field of Classification Search
CPC ..... A23G 3/0085; A23G 3/0093; A23G 3/563
See application file for complete search history.

(56) References Cited

U.S. PATENT DOCUMENTS

| | | | |
|---|---|---|---|
| 1,428,872 | A | 9/1922 | Anderson |
| 2,155,995 | A | 7/1936 | Robb |
| 2,745,374 | A | 5/1956 | Pikal |
| 3,307,517 | A | 3/1967 | Rasmusson |
| 3,648,625 | A | 3/1972 | Glass |
| 3,660,118 | A | 5/1972 | Raimondi et al. |
| 4,189,289 | A | 2/1980 | Getman |
| 6,099,874 | A | 8/2000 | Tucker et al. |

(Continued)

FOREIGN PATENT DOCUMENTS

| | | |
|---|---|---|
| BE | 868498 A2 | 10/1978 |
| CN | 1378426 A | 11/2002 |

(Continued)

OTHER PUBLICATIONS

International Preliminary Report on Patentability for International Application No. PCT/EP2016/060758, dated May 4, 2017.

(Continued)

*Primary Examiner* — Katherine D Leblanc
(74) *Attorney, Agent, or Firm* — The Dobrusin Law Firm, P.C.

(57) ABSTRACT

The present invention relates to a method for coating the head of a lollipop with a coating material.

20 Claims, 5 Drawing Sheets

(56) References Cited

U.S. PATENT DOCUMENTS

| | | |
|---|---|---|
| 6,251,455 B1 | 6/2001 | Thomas |
| 6,666,320 B1 | 12/2003 | Fessler |
| 8,802,173 B2 | 8/2014 | Arampongpun et al. |
| 2003/0228828 A1* | 12/2003 | Coleman .................. A63H 1/02 446/236 |
| 2006/0175178 A1 | 8/2006 | Asma |
| 2009/0130265 A1 | 5/2009 | Leas et al. |
| 2009/0155423 A1* | 6/2009 | Moore .................... A23L 19/00 426/89 |
| 2012/0171335 A1 | 7/2012 | Shecter et al. |

FOREIGN PATENT DOCUMENTS

| | | |
|---|---|---|
| CN | 101378664 A | 3/2009 |
| CN | 201690989 U | 1/2011 |
| DE | 2052616 A | 12/1971 |
| EP | 0919133 A2 | 6/1999 |
| EP | 2308319 A1 | 4/2011 |
| GB | 301911 A | 8/1929 |
| GB | 391121 A | 4/1933 |
| GB | 1106114 A | 3/1968 |
| WO | 0019838 A1 | 4/2000 |
| WO | 2000019838 A1 | 4/2000 |
| WO | 2005014448 A1 | 2/2005 |
| WO | 2009063010 A2 | 5/2009 |

OTHER PUBLICATIONS

International Search Report and Written Opinion for International Application No. PCT/EP2016/060758, dated Aug. 5, 2016.

Chinese Office Action for Chinese Application 201680031600.1; dated Nov. 3, 2020.

Chinese Office Action dated Aug. 6, 2021, for Chinese Application No. 201680031600.1.

Secondary School Physics Thinking Methods and Application, edited by Pei Jialiang, Guangdong Education Press, 1st edition, p. 538, Oct. 1991 (book evidence).

Classic Translation Collection of World Science Masters—Entertaining Physics, (SU) Perelman, Shanghai Science Popularization Press, 1st edition, pp. 26-27, Oct. 2013 (book evidence).

* cited by examiner

METHOD FOR COATING A LOLLIPOP

The present invention relates to a method for coating the head of a lollipop with a coating material.

There is an increasing demand for lollipop heads which are coated with a coating material, particularly with a powdery- and/or granular-material. However coated lollipops had in the past the deficiencies, that the bonding between the coating material and the lollipop head was not sufficient and/or that large parts of the stick were also coated with the coating material, which influenced the optical appearance of the lollipops negatively.

It was therefore the objective of the present invention to provide a method for coating a lollipop which does not have the deficiencies of the state in the art.

The problem is solved with a method for coating the head of a lollipop with a coating material, wherein the lollipop is moved during coating.

The present invention relates to method to coat the head of a lollipop at least partially, preferably entirely with a coating material. The coating material is preferably a powdery- and/or granular material and/or a liquid coating which solidifies on the lollipop head. Examples for a powdery material are spices like pepper, chilly, curry, sugar powder or the like. Examples for a granular material are chocolate chips or nuts. The lollipop is produced, e.g. formed from a sugar mass, without coating and then the coating is added, before the head of the lollipop is preferably wrapped in a wrapping material. The coating material bonds to the lollipop head preferably by an adhesive bond, for example during drying and/or hardening of the material from which the head of the lollipop is made.

The coating material is preferably provided as a bath or a bed of powdery, granular and/or liquid coating material. The coating material is can alternatively or additionally be provided as a spray-material.

According to the present invention, the lollipop moves during the adhesion of the coating material. Preferably, the lollipop moves through a bath or bed of the coating material. During this movement, the lollipop is preferably attached to transportation means, for example a chain, which comprises a multitude of grippers, which hold the stick. Preferably, the head of the lollipop is submerged into the coating material but only until the boundary between the stick and the head of the lollipop, so that the stick gets coated as little as possible.

According to a preferred embodiment of the present invention, the coating material is moved during coating. However, the coating material is not airborne during the coating process. Preferably, the coating material is transported by typical conveying devices which are used for powdery- or granular material and which are for example known from the breading of meat or the like. Preferably the coating material is moved in the same direction as the transportation direction of the lollipops. Even more preferred, the movement velocity of the coating material is at least essentially equivalent to the transportation velocity of the lollipops. This preferred embodiment of the present invention has the advantage that the stick and/or the head of the lollipop are not damaged during coating.

Preferably, the head of the lollipop is submerged into the bed or the bath of the coating material.

According to another preferred or inventive embodiment of the present invention, the coating material is pressed against the head of the lollipop. This can be achieved by applying pressure to the coating material. According to a preferred embodiment, the head of the lollipop and the coating material are transported through a channel whose cross-section reduces with the transportation direction of the coating material and the lollipop. Due to this reduction, the coating material is pressed against head of the lollipop. Due to the pressurized coating material, sufficient coating of the head of the lollipop is achieved and/or the amount of coating material which sticks to the head of the lollipop can be increased with increasing pressure. Preferably, the applied pressure can be adjusted, for example by adjusting the cross-section of the channel, for example by moving the sidewalls of the channel towards or away from the path of the lollipop through the coating material.

Preferably, the stick of the lollipop is at least partially covered during coating. This can for example be done with shield plates or shield lips, which are provided on both sides of the transportation route of the lollipop. The distance of the shield plates/lips is essentially equivalent to the thickness of the stick of the lollipop. Preferably, the shield plates/lips extends essentially until the head of the lollipop. The covering of the stick of the lollipop avoids contamination of the stick with coating material.

According to another preferred or inventive embodiment of the present invention, the head of the lollipop is wetted prior to coating, wherein the head is submerged into a liquid. Due to the wetting the surface of the lollipop head is slightly etched so that the coating material sticks to the lollipop head after re-solidification. According to this embodiment of the present invention, the head of the lollipop is submerged into a liquid bath, preferably, until the entire head of the lollipop is below the liquid level of the bath. The submersion is preferably carried out by corresponding movement of the gripper. Due to the submersion of the lollipop head into a bath, the pollution of the stick with coating material is at least essentially avoided.

According to another preferred or inventive embodiment of the present invention, excess coating material is removed from the lollipop head after coating. This is preferably carried out by a force, an impulse and/or a vibration which is affected onto the lollipop, preferably downstream of the coating and upstream from a drying- and/or packaging station. The removal of excess coating material assures that machine parts downstream from the coating station are not contaminated with coating material. Also loose coating material in a wrapping of the lollipop head is essentially avoided.

Preferably, the lollipop is dried and/or cooled after coating.

According to a preferred embodiment, the lollipop is permanently gripped at its stick during wetting and/or coating and/or drying and/or wrapping. Due to the permanent gripping particularly after coating and during wrapping of the lollipop head with a wrapping material, it is assured that the coated lollipop head does not get damaged, especially coating material is removed from the head and that the stick is polluted with coating material.

Preferably, the wetting, the coating, drying and the wrapping of the lollipop are provided as an inline solution, wherein the lollipop is gripped by its stick upon entry of the wetting station and is then permanently gripped by at least one gripper during the entire process until its exits the wrapping station. Each unit may be provided with a transportation unit, for example an endless chain with grippers attached to it. However, the lollipop is preferably never released. During hand over from transportation unit to the next at a certain instance two grippers each connected to a different transportation unit grip the same stick of a lollipop.

Preferably, the stick of the lollipop is vertical during coating and/or wetting and/or drying.

During wetting and/or coating and/or drying, the lollipop is fastened to a gripper at its stick. Preferably, the lollipop is transported through the wetting and/or coating apparatus with the stick in a vertical position and the head of the lollipop extending downwards, i.e. in the direction of the gravitational force.

The inventions are now explained according to FIGS. 1-5. These explanations are only exemplary and do not limit the scope of protection. The explanations apply to all inventions likewise.

Figure 1:
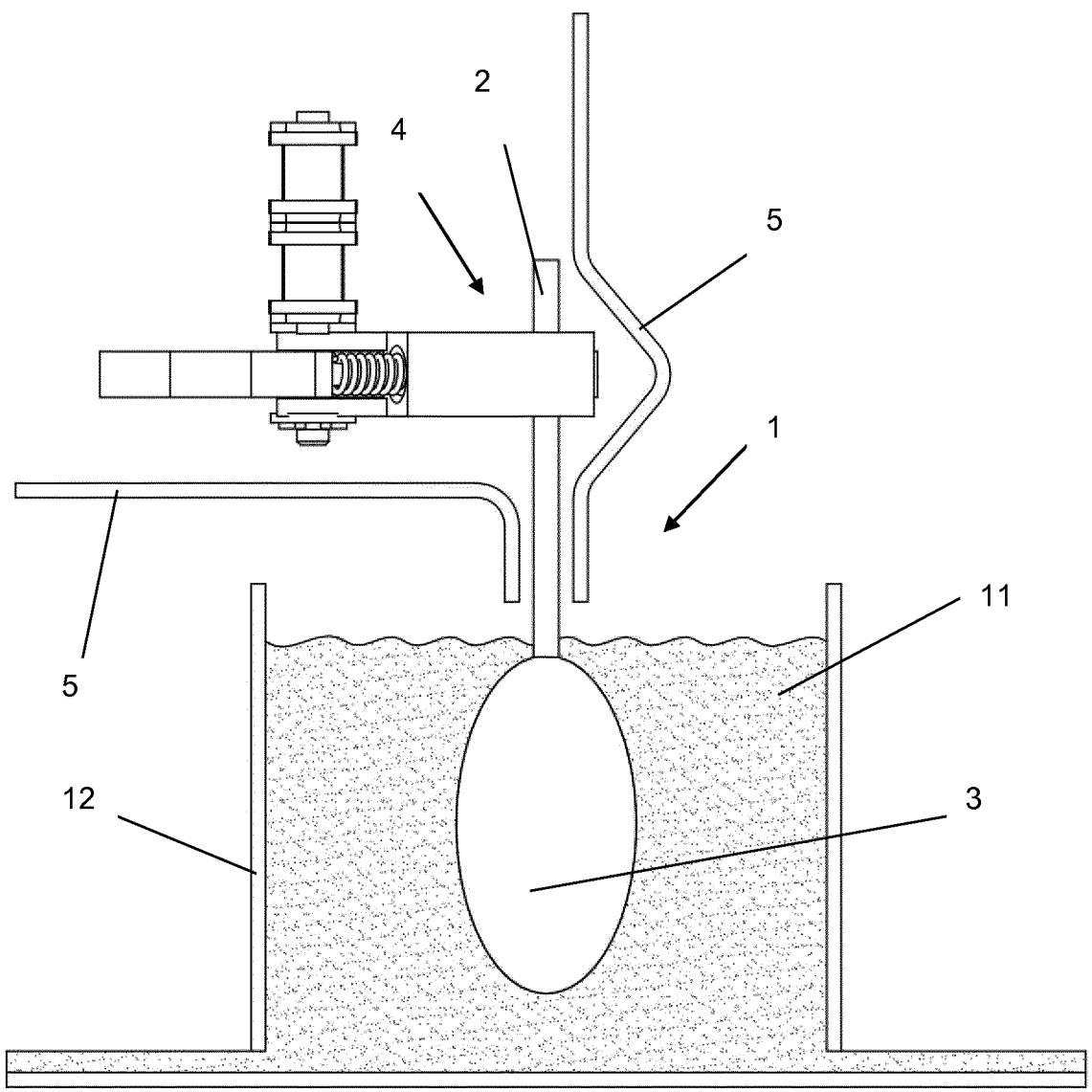
FIGS. 1 and 4 show the coating of the lollipop head with a coating material.
Figure 4:
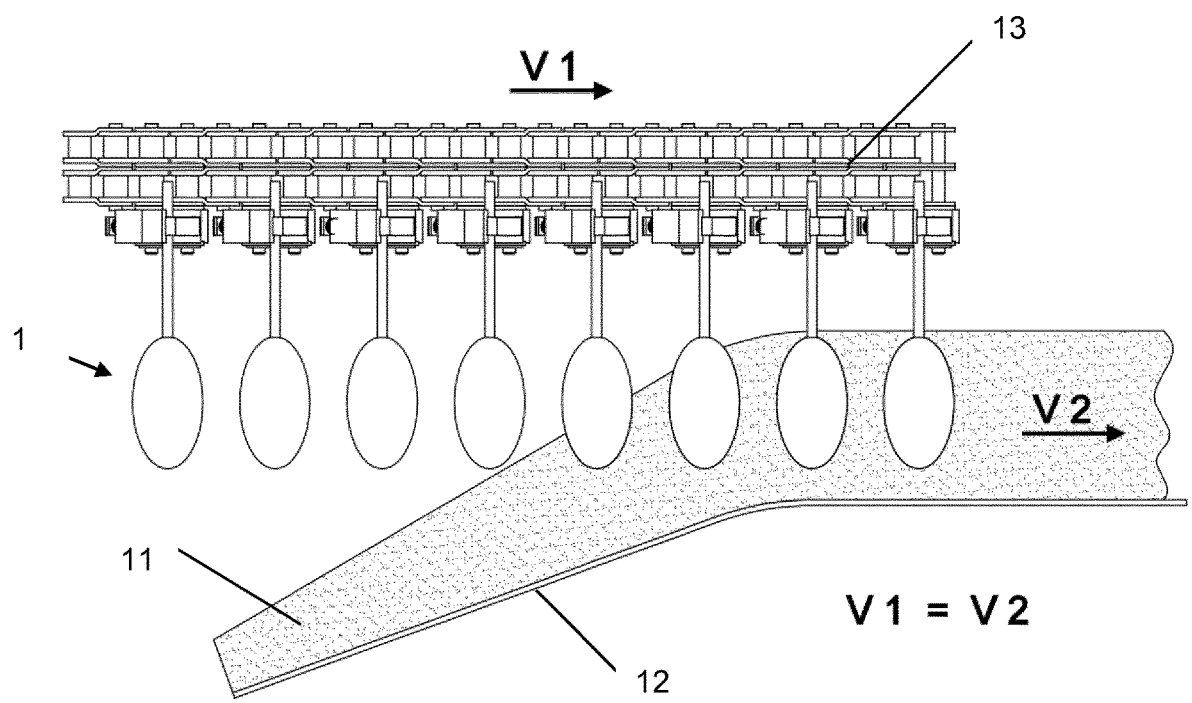

FIGS. 1 and 4 show the coating of the lollipop head 3. The lollipop 1 comprises a head 3 and a stick 2. Through the entire coating process, each stick is gripped by a gripper 4. The gripper 4 maintains the lollipop in the present example in a vertical position with the head 3 of the lollipop 1 downwards throughout the coating process. In order to coat the head of 3 of the lollipop 1 with a coating material 11, the lollipop head is submerged into the coating material 11. As can be particularly seen from FIG. 4, the lollipops 1 move during coating with a velocity V1. This movement is for example accomplished by moving transportation means 13, in the present example a chain, to which the grippers 4 are attached preferably equal-distantly. As can be also seen from FIG. 4 according to a preferred embodiment, the coating material is moved as well, more preferably at least partially in the same direction as the movement of the lollipops. In the preferred embodiment, the velocities V1 and V2 are at least essentially, preferably, entirely equal. Therefore, the coating apparatus comprises means (not depicted), for example a belt, a chain, a grid, and/or shovels to move the coating material parallel to the transport direction of the lollipops. Those means are for example known from the breading industry which coats for example meat with a breading substance. In the present example, the coating material is lifted via a ramp which is part of the coating apparatus 12 upwardly towards the lollipop heads 3. The cross section of the channel through which the lollipop passes during its coating, can preferably altered in order to increase or decrease the pressure by which the coating material is pressed against the lollipop head. This can, for example, be carried out by moving one or more sidewalls of the channel. After the lollipops have been coated, the excess coating material is preferably recycled to the entering region of the coater and then reused. According to a preferred embodiment, the coating material and the lollipops are transported through a channel which is open at its top which can be particularly seen from FIG. 1. Preferably the cross section of this channel reduces in the transport direction of the coating material and/or the lollipops. Due to this reduction, the coating material is pressed towards the head of the lollipop, which improves the coating of the lollipop particularly the amount of material that sticks to the head of the lollipop. Referring now to FIG. 1, it can be seen, that the stick 2 of the lollipop is partially covered by protection means 5, in the present case shield plates, which extend at least partially along the pass of the lollipop through the coater. This protection means at least partially avoid that the stick of the lollipop is coated with coating material.

Figure 2:
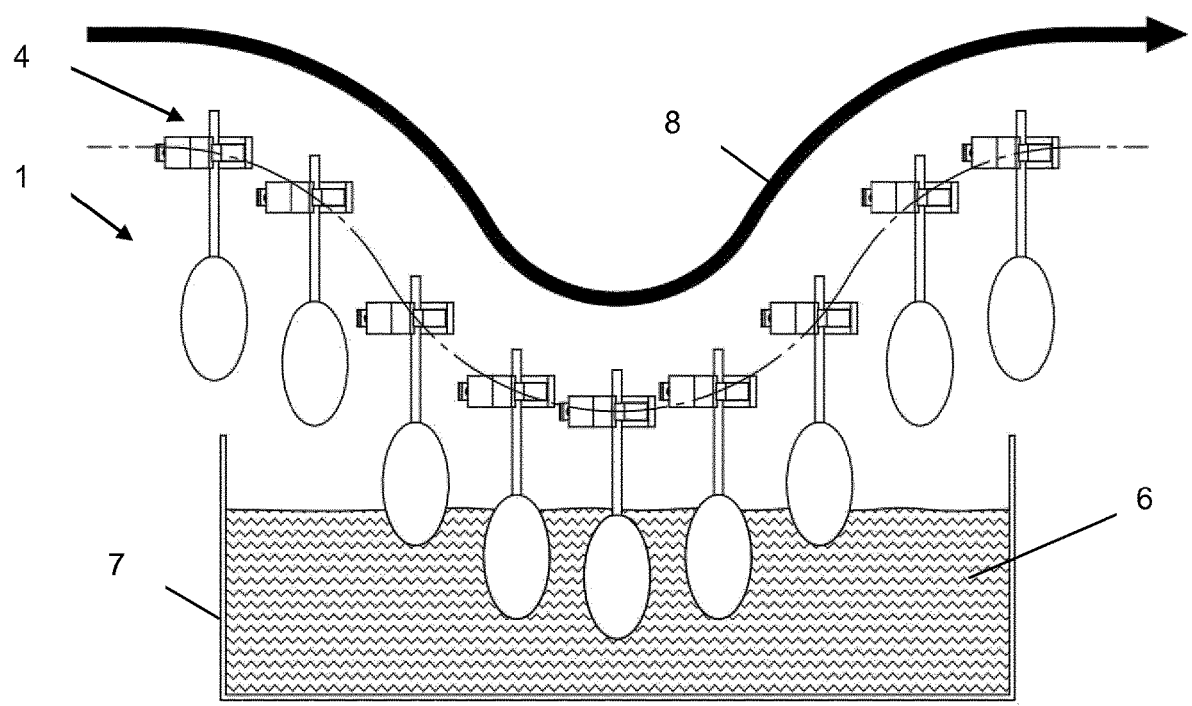
FIGS. 2 and 3 show the wetting of the lollipop head.
Figure 3:
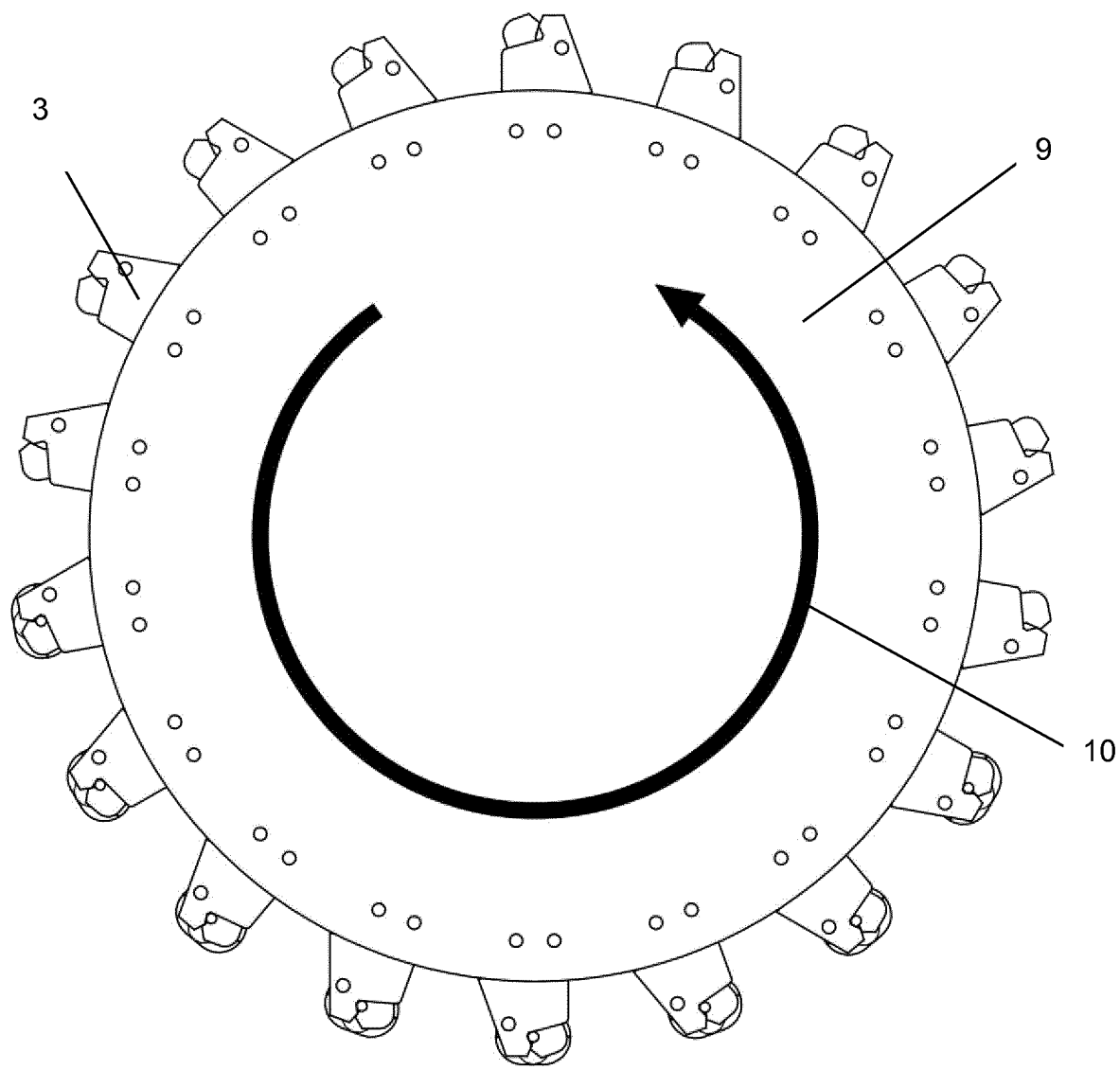

Reference is now made to FIGS. 2 and 3 which depict the wetting of the lollipop head 3. Through the entire wetting process, each stick is gripped by a gripper 4. The gripper 4 maintains the lollipop in the present example in a vertical position with the head 3 of the lollipop 1 downwards throughout the entire wetting process. The wetting station is provided upstream from the coater. Between wetting and coating the lollipops are preferably handed over between two grippers, i.e. the transportation means for the wetting station are preferably different from the transportation means of the coater. The wetting station comprises a liquid bath 6, into which the heads of the lollipops are submerged. This is achieved by a downward movement of the transportation means of the lollipops. As can be seen from FIG. 3 during this downward movement, the grippers preferably also move along a horizontal circular pass. Due to the submersion of the heads of the lollipop into a liquid bath, it is avoided, that the stick is wetted as well, which also avoids, that a significant amount of coating material attaches to this stick.

Figure 5:
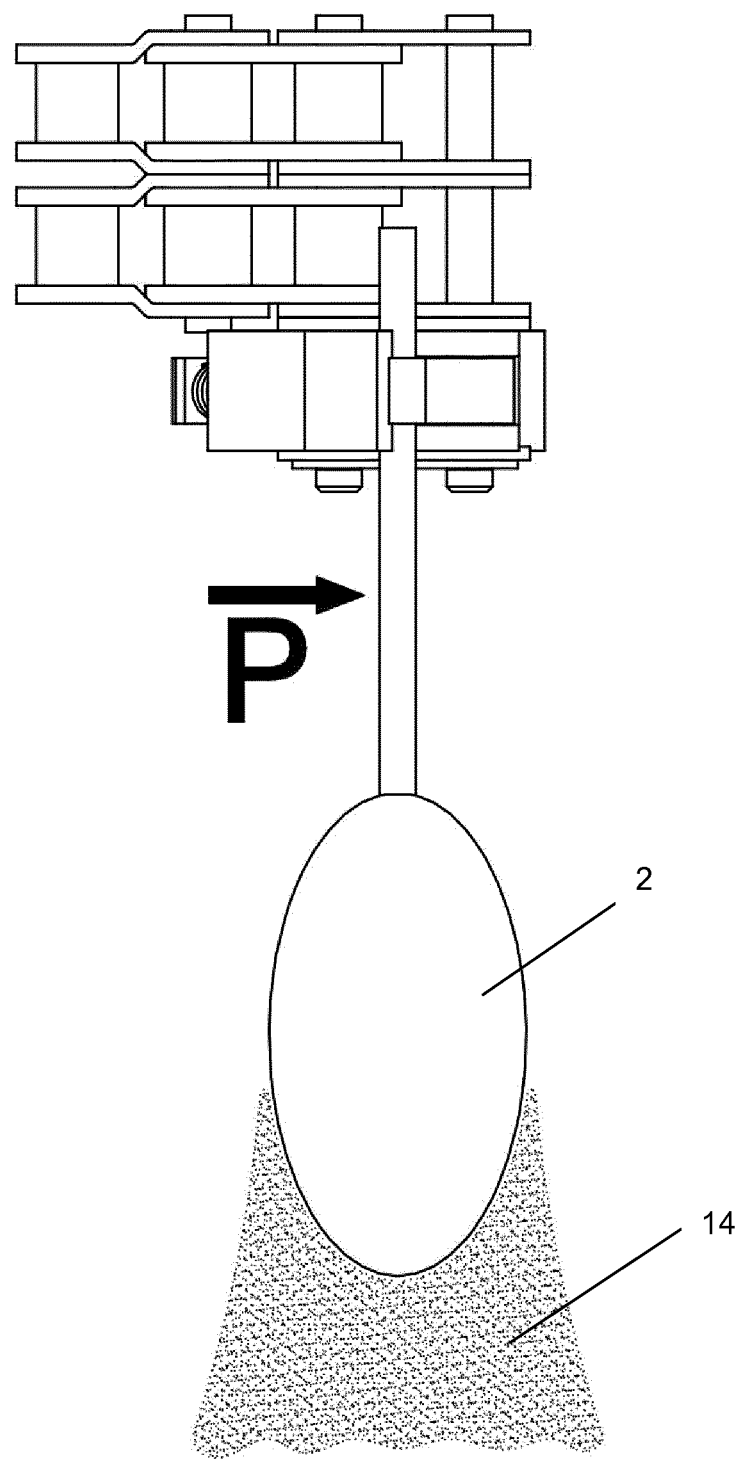
FIG. 5 shows the removal of excess coating material.

As can be seen from FIG. 5, after coating, excess coating material 14 is removed from the head of the lollipop. This is for example achieved by applying a force, an impulse and/or a vibration P to the stick of the lollipop. Due to this force impulse and/or vibration, the excess material is removed from the lollipop head so that it cannot contaminate the apparatus downstream from the coater.

LIST OF REFERENCE SIGNS

1 Lollipop
2 Stick
3 Head
4 Gripper
5 Protection means, shield plate
6 Liquid, Water
7 Container
8 Vertical movement of the gripper
9 Turntable
10 Horizontal movement of the gripper
11 Coating material, bed and/or bath of the coating material.
12 Coating apparatus, coater
13 Transportation means, Chain
14 Excess coating material
V1 velocity of the transport means of the lollipops
V2 velocity of the coating
P impulse

The invention claimed is:

1. A method comprising:
coating a head of a lollipop with a powdery and/or granular coating material that is provided as a bed,
moving the lollipop with a transportation means during the coating;
submerging the head of the lollipop in the coating material but only to a boundary between a stick of the lollipop and the head, and
moving the bed of the coating material with a means that is a belt, chain, grip, or a shovel during the coating in a same direction as a transport direction of the lollipop.

2. The method according to claim 1, wherein the method comprises: pressing the coating material against the head of the lollipop.

3. The method according to claim 1, wherein the method comprises: at least partially covering the stick of the lollipop during the coating.

4. The method according to claim 1, wherein the method comprises: wetting the head of the lollipop prior to the coating, the wetting comprises submerging the head into a liquid.

5. The method according to claim 1, wherein the method comprises: removing excess coating material from the head after the coating.

6. The method according to claim 1, wherein the method comprises: drying the lollipop after the coating.

7. The method according to claim 1, wherein the method comprises: a wetting step, and/or a drying step, and/or a wrapping step, and
wherein the method comprises gripping the stick during the wetting step and/or during the coating step, and/or during the drying step, and/or during the wrapping step.

8. The method according to claim 1, wherein the method comprises a wetting step, and/or a drying step, and
wherein the stick of the lollipop is vertical during the wetting step and/or during the coating step and/or during the drying step.

9. The method according to claim 1, wherein the lollipop is wrapped after the coating step.

10. The method according to claim 1, wherein the lollipop is moved with the transportation means at a first velocity, the bed of the coating material is moved with the means at a second velocity, and
wherein the first velocity and the second velocity are generally equal.

11. The method according to claim 1, wherein the transportation means comprises a chain and a multitude of grippers.

12. The method according to claim 1, wherein the method comprises a wetting step, and between the wetting step and the coating step, the lollipop is handed over between two grippers.

13. The method according to claim 4, wherein during the submerging step, the lollipop moves along both a downward movement and a horizontal circular pass.

14. The method according to claim 1, wherein after the coating step, a force, an impulse, and/or a vibration is applied to the stick.

15. The method according to claim 5, wherein during the removing step, a force, an impulse, and/or a vibration is applied to the stick.

16. The method according to claim 1, wherein the head of the lollipop and the coating material are transported through a channel whose cross-section reduces in the transportation direction.

17. The method according to claim 1, wherein the coating material is free of being airborne during the coating.

18. A method of coating a head of a lollipop with a powdery and/or granular coating material that is provided as a bed comprising:
moving the lollipop with a transportation means;
submerging the head of the lollipop into the bed of the coating material only to a boundary between a stick of the lollipop and the head of the lollipop during the moving the lollipop step;
pressing the coating material against the head of the lollipop;
moving the bed of the coating material during the coating and during the submerging in a same direction as a transport direction of the lollipop;
wetting the head of the lollipop prior to the coating, the wetting comprises submerging the head into a liquid;
removing excess coating material from the head of the lollipop;
drying the lollipop;
gripping the stick during the wetting, the coating, the drying, and wrapping;
wherein the stick of the lollipop is vertical during the wetting, the coating, and the drying, and
wherein the coating material is free of being airborne during the coating.

19. The method according to claim 18, wherein during the submerging step, the lollipop moves along both a downward movement and a horizontal circular pass.

20. The method according to claim 18, wherein after the coating step, a force, an impulse, and/or a vibration is applied to the stick.

* * * * *